(12) United States Patent
Kawabata et al.

(10) Patent No.: US 6,665,263 B1
(45) Date of Patent: Dec. 16, 2003

(54) VP PROTECTION SYSTEM AND VP PROTECTION METHOD

(75) Inventors: Mitsuru Kawabata, Tokyo (JP); Shinobu Sasaki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/373,179

(22) Filed: Aug. 12, 1999

(30) Foreign Application Priority Data

Aug. 14, 1998 (JP) .......................................... 10-229218

(51) Int. Cl.⁷ .............................................. H04L 12/28
(52) U.S. Cl. ...................... 370/219; 370/220; 370/395.1
(58) Field of Search ................................. 370/216, 217, 370/218, 219, 220, 221, 225, 228, 241.1, 242, 244, 351, 902, 395.1, 397, 399; 379/221.01, 221.03; 709/239

(56) References Cited

U.S. PATENT DOCUMENTS

| | | | |
|---|---|---|---|
| 5,467,348 A | * 11/1995 | Fujii et al. ................... | 370/468 |
| 5,793,745 A | * 8/1998 | Manchester ................... | 370/224 |
| 5,838,924 A | * 11/1998 | Anderson et al. ........... | 370/352 |

FOREIGN PATENT DOCUMENTS

JP     10-84362     3/1998

OTHER PUBLICATIONS

Fujii et al, Restoration Message Transfer Mechanism and Restoration Characteristics of Double–Search Self–Healing ATM network, IEEE, pp. 149–158, Jan. 1994.*

Chan et al, An Architecture for Externally Controllable Virtual Networks and its Evaluation on NYNET, pp. 1–91, Columbia University, Feb. 5, 1997.*

Draft Recommendation I.PS (ATM Protection Switching), *International Telecommunication Union, Telecommunication Standardization Sector* (1997–2000), Study Group 13—Contribution_(2)_, Nov. 1997, pp. 1–35.

* cited by examiner

*Primary Examiner*—Dang Ton
*Assistant Examiner*—Frank Duong
(74) *Attorney, Agent, or Firm*—Dickstein, Shapiro, Morin & Oshinsky, LLP.

(57) ABSTRACT

The present invention provides a VP protection system and a VP protection method which forward messages quickly to nodes on an ATM network when an error occurs on the ATM network and reduce an error recovery time. The VP protection system, for use on an ATM network that includes a plurality of ATM nodes performing protection, a plurality of working VPs, and a plurality of standby VPs, exchanges messages among ATM nodes when an error occurs, one group of VPs at a time. An intermediate ATM node in a standby path at least comprises a VPG resource information management table, a VP resource information management table, a VPG configuration information management table, a VPG switching message receiving circuit, a VPG switching message sending circuit, node resource management circuits, a VPG resource allocation circuit, a VP expansion circuit, and a VP resource distribution circuit.

17 Claims, 8 Drawing Sheets

VP PROTECTION SYSTEM AND VP PROTECTION METHOD

BACKGROUND OF THE INVENTION

1. Field of the Invention

The present invention relates to a VP (Virtual Path) protection system for use when an error occurs on an Asynchronous Transfer Mode (ATM) network, and more particularly to a VP protection system and a VP protection method for restoring many VPs at a time when errors occur in many VPs on the same link at the same time.

2. Description of the Related Art

When errors occur on a plurality of working VPs on an working (active) path at the same time, many control messages, including error messages and switching request messages, are generated for VPs. This results in heavy message-forwarding traffic among nodes in the switching section of the network.

To solve this problem, a, method for grouping a plurality of VPs into a Virtual Path Group (VPG) is known. For example, Japanese Patent Laid-Open Publication No. A-10-84362 discloses a method for providing an address table associating VPGs with VPs belonging thereto. In addition, ITU-T SG13 Recommendation Draft I. ps (issued in November, 1997) proposes OAM (Operation and Maintenance) cells for use as switching control messages for each VPG.

The conventional VP protection method will be described with reference to drawings. FIG. 4 is a diagram schematically showing an example of an ATM network. This network is composed of a plurality of ATM nodes 101–104. ATM nodes 101 and 102 are linked by physical link 111, ATM nodes 102 and 103 are linked by physical link 112, ATM nodes 101 and 104 are linked by physical link 113, and ATM nodes 104 and 103 are linked by physical link 114, respectively.

n working VPs passing through the ATM node 102 are set up between the ATM nodes 103 and 101 which are the endpoint nodes of a switching section on this network. These n VPs are grouped into an working VPG 121. For the working n VPs between the ATM nodes 103 and 101 which are the endpoint nodes of the switching section, n standby (protection) VPs for which only a path is determined but no bandwidth is assigned are provided in advance. These n standby VPs are grouped into a standby VPG 122.

Also, in the network configuration shown in FIG. 4, two message exchange channels are defined between the ATM node 101 and the ATM node 103: one is a message exchange channel 123 from the ATM node 101 to the ATM node 103 and the other is a message exchange channel 124 from the ATM node 103 to the ATM node 101.

If an error occurs on a physical link 111 in the configuration described above the ATM node 101 senses this error and sends a VPG switching request message 131 via the message exchange channel 123.

Because only paths are set up but no bandwidth is allocated to the standby VPs of the standby VPG 122, the nodes on the standby path via which the switching request message 131 is sent allocate bandwidth required by the standby VPs.

The switching request message 131 is sent from the ATM node 101 which is the switching-request message originating endpoint to the ATM node 103 which is the switching-request message receiving endpoint. During this period, the ATM node 101 and the intermediate ATM node 104 allocate bandwidth to the standby VPs.

After allocating bandwidth at the ATM node 103, a VPG switching-response message 132 is sent through the message exchange channel 124 to the ATM node 101 via the intermediate ATM node 104 to notify that bandwidth has been allocated at all nodes on the standby path.

Upon receiving the switching-response message 132, the ATM node 101 knows that the bandwidth resource has been allocated to the standby VPG. Then, the ATM node 101 switches all working VPs to standby VPs.

Referring to FIG. 5, the internal processing of a node during the above-mentioned protection processing will be described. FIG. 5 shows the configuration of, and processing flow of control within, an intermediate node .(ATM node 104 in FIG. 4) on a standby path when conventional protection is performed with the use of VPG switching messages.

As shown in FIG. 5, an ATM node 200 comprises a VPG switching message receiving circuit 201 which receives grouped alarm messages or switching request messages, a VPG switching message sending circuit 202 which sends a VPG switching message to the next node, a VPG expansion circuit 203 which expands a VPG into individual VPs, a VP resource allocation circuit 204 which allocates resources to each VP, one or more node resource management circuits 206-i (i=1, 2, . . . , n) which manage the allocation of resources of the entire node, a VP resource information management table 251 which stores therein the resource requirements for each VP, and a VPG configuration information management table 252 which stores therein information for identifying the VPs constituting the VPG.

The ATM node 200 forward,s a switching-request message 291 or a switching-response message 292. When the switching-request message 291 arrives at the ATM node 200, the VPG switching message receiving circuit 201 receives it, identifies that the message is issued to the VPG, and sends it to the VPG expansion circuit 203.

The VPG expansion circuit 203 references the VPG configuration information management table 252 to expand the VPG specified by the switching-request message into the individual VPs constituting the VPG and then sends the identifiers of the individual VPs to the VP resource allocation circuit 204.

The VP resource allocation circuit 204 finds the amount of resources required for each VP by referencing the VP resource information management table 251 and allocates the required node resources and network resources with the use of the node resource management circuits 206-i (i=1, 2, . . . n).

After allocating resources to all VPs, the VP resource allocation circuit 204 sends the switching-request message 291, either via the VPG expansion circuit 203 or directly, to the VPG switching message sending circuit 202. The VPG switching message sending circuit 202 sends the switching-request message 291 to the next node.

The VPG switching-response message 292 is sent or received by the VPG switching message receiving circuit 201 and the VPG switching message sending circuit 202.

Although the configuration of an intermediate node is shown in FIG. 5, it may be applied also to an endpoint node. For example, at a switching-request message sending endpoint node (ATM node 101 in FIG. 4), the switching-request message 291 shown in FIG. 5 is an error information message and the switching-response message is terminated at this node.

Also, a switching-request message receiving endpoint node (ATM node 103 in FIG. 1) sends a switching-response message instead of a switching-request message. The operation of this endpoint node is basically the same as that of the intermediate node shown in FIG. 5.

As described above, the conventional VP protection method uses VPG node-to-node messages to reduce the amount of transfer messages. However, after receiving a message, the endpoint nodes and intermediate nodes that forward the VPG message must allocate resources, such as bandwidths and paths, to each VP of the VPG where an error occurred.

This requires the node to expand the VPG message into messages for the VPs and, after completion of processing for all VPs, to generate a VPG message again for transmission to the next node.

In this case, the node cannot forward the message to the next node until the processing of all VPs is completed, increasing the time needed for recovery from the error.

This problem will be described with reference to FIG. 6. FIG. 6 shows the switching sequence on the standby path when error recovery is performed with the conventional protection method in the network configuration shown in FIG. 1.

As shown in FIG. 6, when the ATM node 101 detects an error in the working path, it first references the message issued to the VPG and then performs VP expansion processing 311 to expand the VPG into individual VPs.

After performing VP resource allocation processing 312 for each VP, the ATM node 101 sends the VPG switching-request message to the ATM node 104 which is the next node.

The ATM node 104 performs the same processing in the same sequence. That is, it performs the VP expansion processing 311 and the VP resource allocation processing 312 sequentially. After the VP resource allocation processing 312 is completed, the ATM node 104 sends the VPG switching-request message to the ATM node 103 which is the next node.

The ATM node 103, the other endpoint of switching, performs the same processing and sends the switching-response message to the ATM node 101.

The ATM node 104 performs forwarding processing 313 to forward the switching-response message to the ATM node 101. When the switching-response message arrives at the ATM node 101, the switching processing ends.

According to the conventional method, each node has to expand the VPG and allocate resources for each VP before sending the switching-request message to the next node, as described above. Therefore, the message transmission wait time increases as the number of VPs increases, resulting in a significant increase in the error recovery time.

SUMMARY OF THE INVENTION

The present invention seeks to solve the problems associated with the prior art described above. It is an object of the present invention to provide a VP protection system and a VP protection method, for use when an error occurs on an ATM network with many VPs, which are capable of sending a message quickly to other nodes on the ATM network to reduce the time required for error recovery.

To achieve the above object, according to one aspect of the present invention, there is provided a VP protection system which restores VPs when an error occurs on an ATM (Asynchronous Transfer Mode) network, wherein a predetermined node in the ATM network allocates resource information on a plurality of working VP groups for management of resources on a group basis and wherein, when a plurality of VPs must be switched to standby VPs, which are previously-reserved as bypass paths, due to the error that occurred in the plurality of VPs in a link at the same time, at least an intermediate node allocates the resources for the group composed of the plurality of VPs in response to a grouped VP switching request message and forwards the grouped VP switching request message to a next node.

According to another aspect of the present invention, there is provided a VP protection system, for use on an ATM network including a plurality of ATM nodes performing protection, a plurality of working VPs (virtual paths) usually used as information transmission paths among the plurality of nodes, and a plurality of standby VPs used as bypass paths when an error occurs on the working VPs, wherein, when the plurality of working VPs must be switched to the corresponding standby VPs upon detection of the error on the plurality of working VPs, messages are exchanged among the ATM nodes with the plurality of VPs as a group, each of the ATM node comprising a VPG resource information management table which stores therein an amount of resource requirements for each virtual path group (called VPG); a VP resource information management table which stores therein the amount of resource requirements for each VP; a VPG configuration information management table which stores therein information for identifying the VPs constituting the VPG; a VPG switching message receiving circuit and a VPG switching message sending circuit which receive and send a VPG switching request message or a VPG switching response messages transferred between endpoint nodes in a switching section; one or more node resource management circuits which allocate node resources or network resources in response to a request generated in the node; a VPG resource allocation circuit which references the VPG resource information management table to allocate the node resources and the network resources to the VPG at a time in response to the VPG switching request message; a VP expansion circuit which expands the VPG into the individual VPs constituting the VPG; and a VP resource distribution circuit which references the VP resource information management table and distributes the VPG resources allocated by the VPG resource allocation circuit to the individual VPs expanded by the VP expansion circuit.

According to another aspect of the present invention, there is provided a VP protection system wherein, immediately after the VPG resource allocation circuit has allocated resources of the VP group, the VPG switching message sending circuit forwards the message to the next node and, at the same time, the VP expansion circuit expands the VP group into VPs and the VP resource distribution circuit distributes the resources to the VPs.

According to another aspect of the present invention, there is provided a VP protection system, wherein, after the VPG switching message receiving circuit receives the switching response message, the VPG switching message sending circuit forwards the switching response message to the next node without checking that the resource distribution circuit has completed resource distribution to the VPs in the ATM node.

According to another aspect of the present invention, there is provided a VP protection system, wherein the node further comprises a resource allocation checking circuit to receive a resource allocation completion notification from the resource distribution circuit upon completion of VP resource distribution, and wherein, in response to the switching response message received by the VPG switching message receiving circuit, the resource allocation checking circuit checks if a resource allocation completion notification is received. If the notification is already received, the VPG switching message sending circuit forwards the switching response message to the next node; if the notification is not yet received, the resource allocation checking circuit waits for the resource allocation completion notification and then the VPG switching message sending circuit forwards the switching response message to the next node.

DESCRIPTION OF THE PREFERRED EMBODIMENTS

Figure 1:
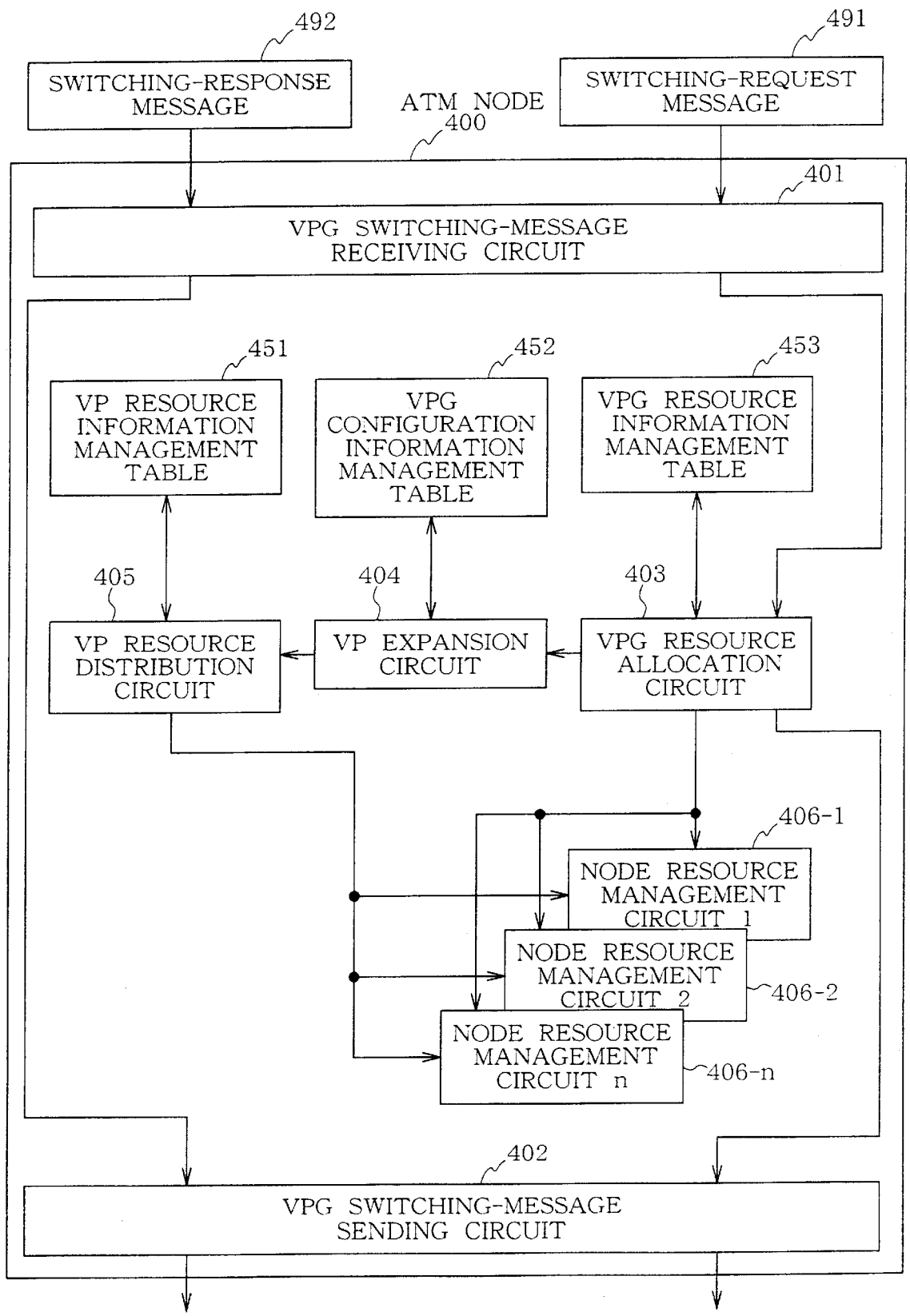
FIG. 1 is a diagram showing the configuration of an intermediate node in a standby path on a network used in a first embodiment of the present invention.

The present invention will be described in detail by referring to the attached drawings. FIG. 1 shows the best mode of carrying out a VP protection system according to the present invention. The VP protection system, for use on an ATM network that includes a plurality of ATM nodes performing protection, a plurality of working VP paths, and a plurality of standby VPs, exchanges messages among the ATM nodes when an error occurs, one group of VPs at a time. An intermediate ATM node (400) in a standby path at least comprises VPG resource information management means (453), VP resource information management means (451), VPG configuration information management means (452), VPG switching message receiving means (401), VPG switching message sending means (402), node resource management means (406), VPG resource allocation means (403), VP expansion means (404), and VP resource distribution means (405).

In one mode of carrying out the present invention, immediately after the VPG resource allocation means (403) has allocated the resources to a VPG, the VPG switching message sending means (402) may forward a message to the next node and, at the same time, the VP expansion means (404) may perform VP expansion processing and subsequent resource distribution to individual VPs.

Also, after an ATM node receives a switching-response message with the use of the VPG switching message receiving means (401), the VPG switching message sending means (402) may forward the switching-response message to the next node before checking that resource distribution to each VP has completed in the ATM node.

Figure 3:
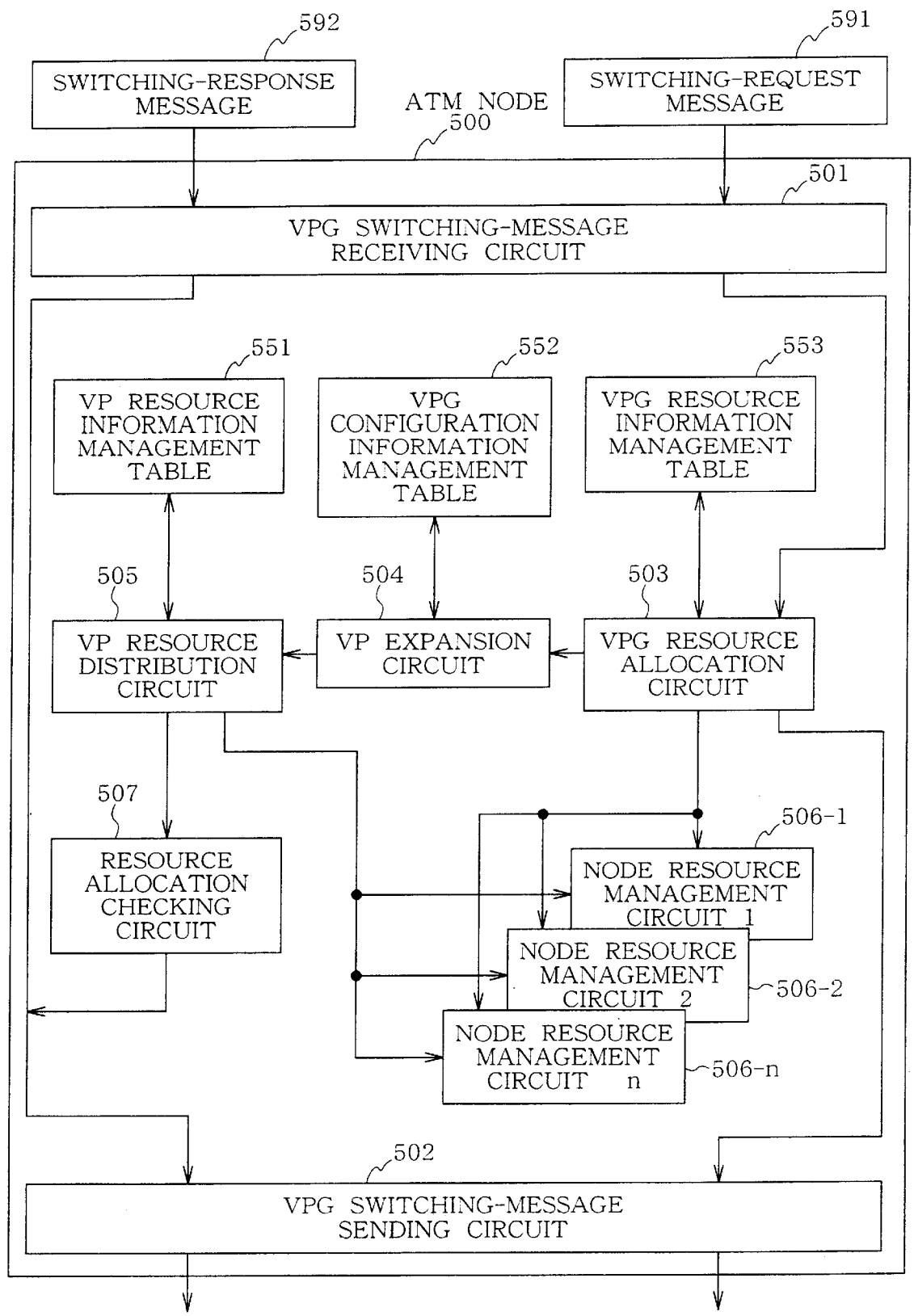
FIG. 3 is a diagram showing the configuration of a node in a standby path on a network used in a second embodiment of the present invention.

In another mode of carrying out the present invention, the ATM node further comprises resource allocation checking means (507) which receives a resource allocation completion notification from the VP resource distribution means (505), as shown in FIG. 3. After the VPG switching message receiving means (501) receives the switching response message, the resource allocation checking means (507) checks if it receives the resource allocation completion notification. If the completion notification is received, the VPG switching message sending means (502) forwards the switching-response message to the next node; if the completion notification is not yet received, the node waits until it receives the resource allocation completion notification before the VPG switching message sending means (502) forwards the switching-response message to the next node.

EXAMPLES

Figure 4:
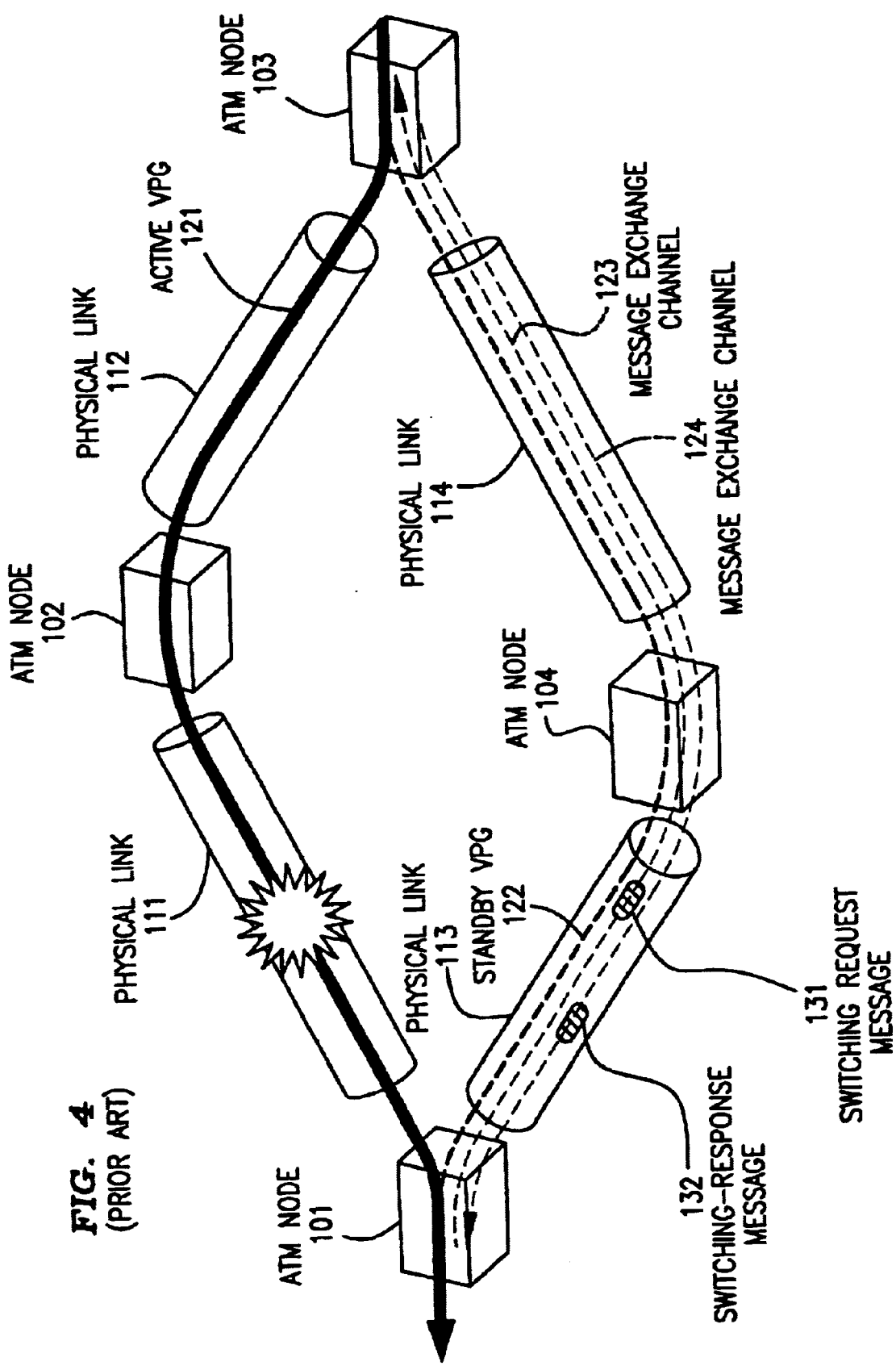
FIG. 4 is a diagram schematically showing an example of network configuration used in the description of the present invention and a conventional method.
Figure 5:
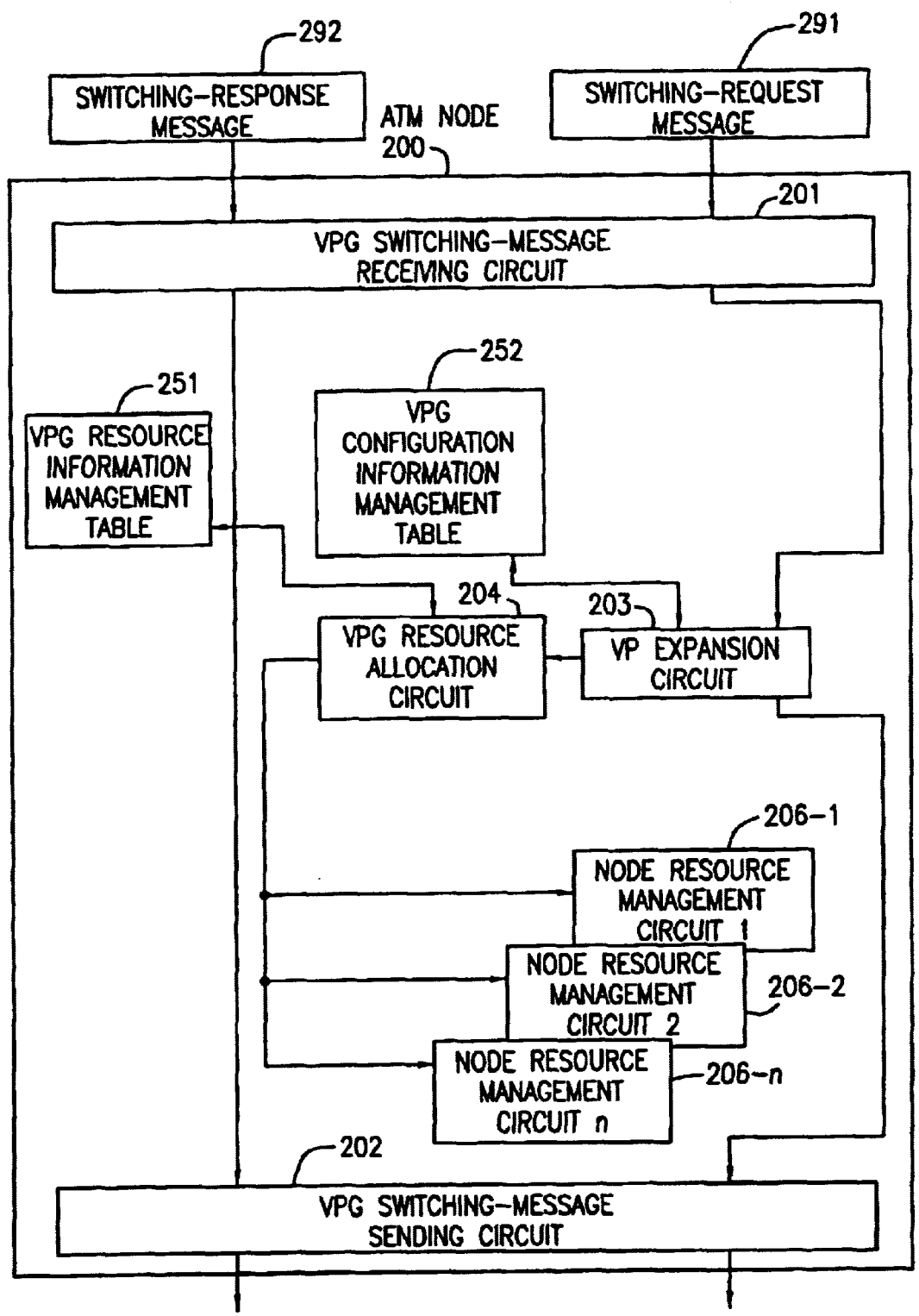
FIG. 5 is a diagram showing the configuration of an intermediate node in a standby path during conventional VP protection processing.
Figure 6:
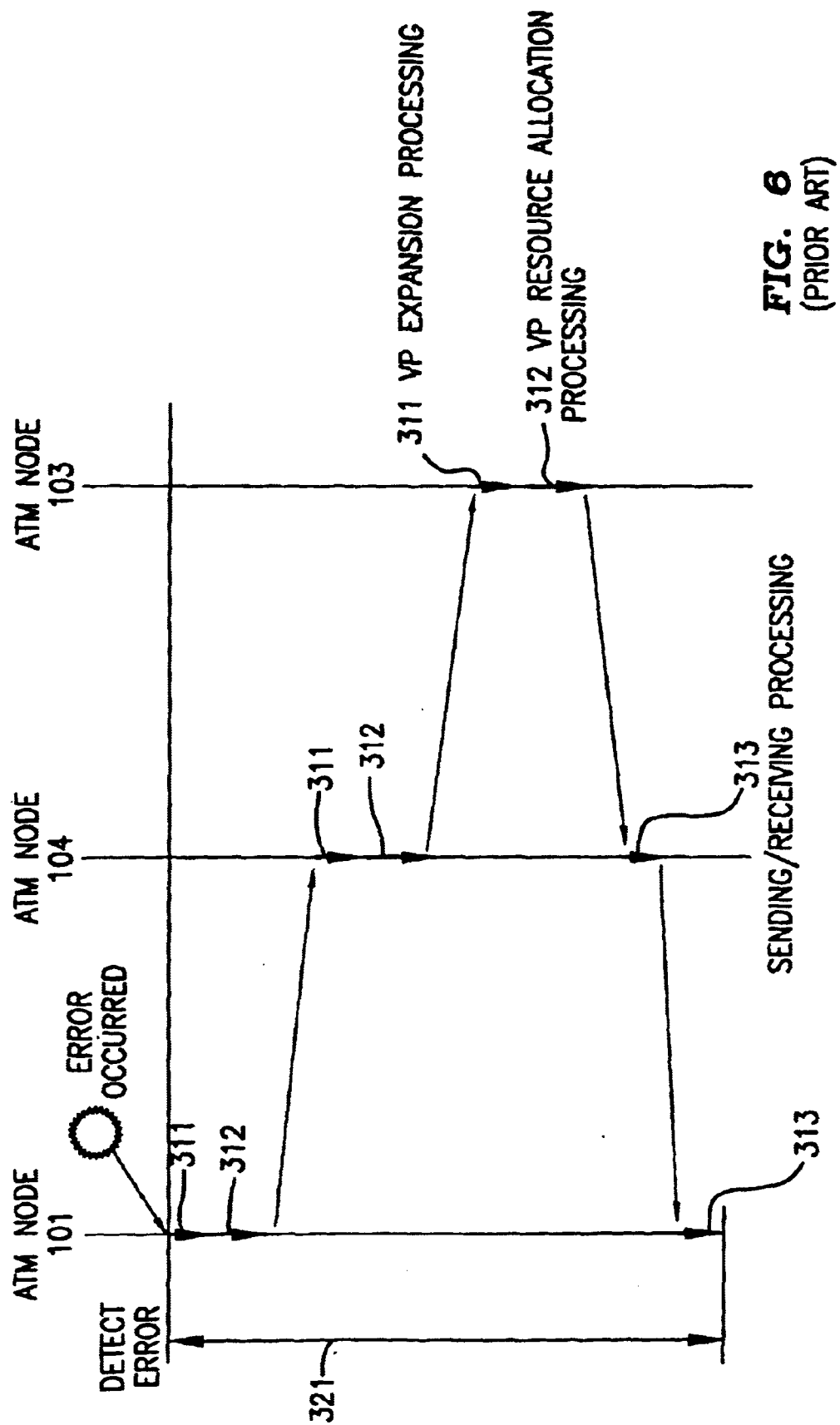
FIG. 6 is a diagram showing the switching sequence in the standby path executed when the conventional VP protection processing system is used.

Some embodiment s of the present invention will now be described in detail by referring to the attached drawings. The network configuration shown in FIG. 4 is used in the description as a network configuration to which the present invention is applied. It should be noted that the embodiments relate to the internal processing of a node and the time needed for switching processing. The protection procedure for the entire network (for example, the sending/receiving procedure for VP switching-request messages and switching-response messages transferred between nodes) is basically the same as that of the conventional technology.

First Embodiment

A first embodiment of the VP protection system according to the present invention will be described with reference to FIGS. 1, 2, and 4. FIG. 1 shows the configuration of an intermediate node in a standby path (ATM node 104 in FIG. 4) included in a network to which the first embodiment of the present invention is applied.

Figure 2:
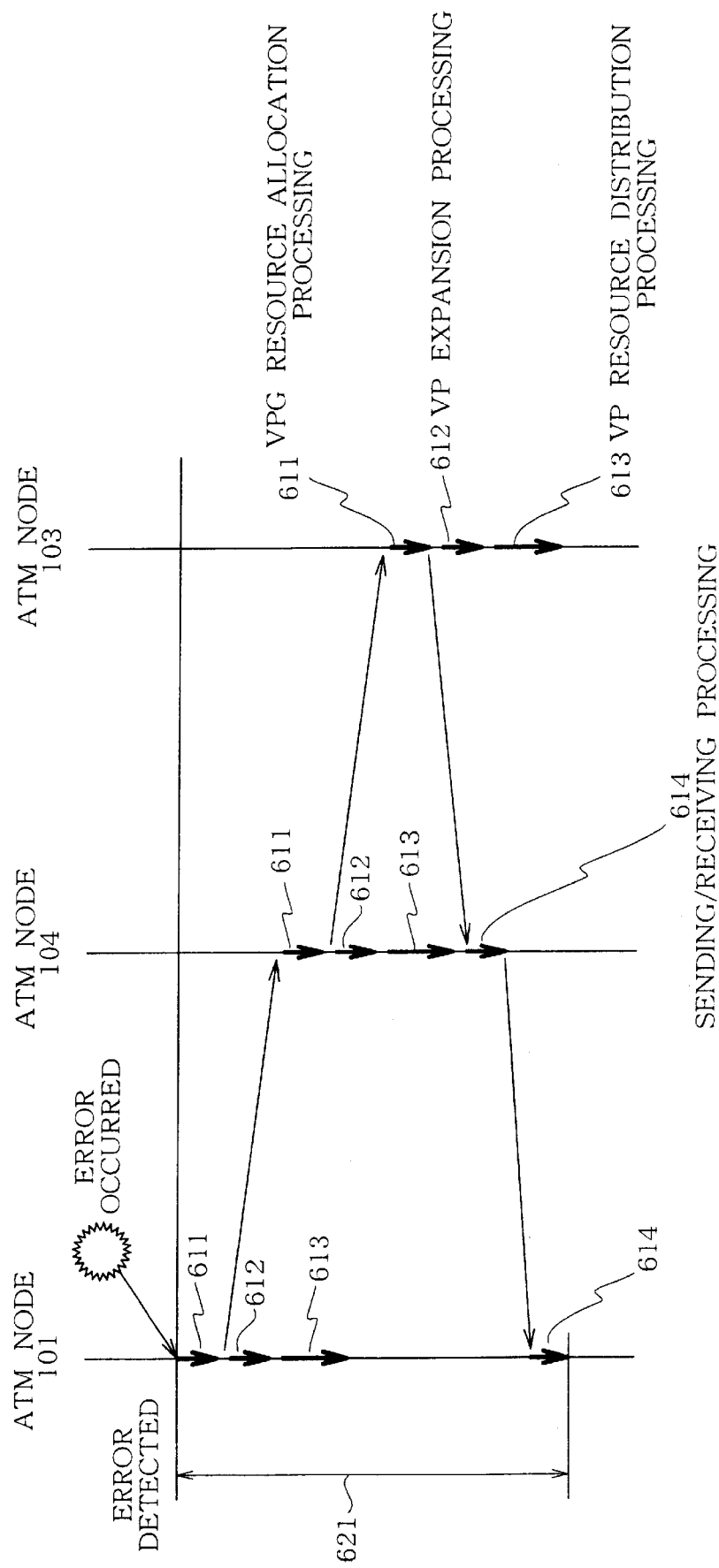
FIG. 2 is a diagram showing the switching sequence of the standby path used in the first embodiment of the present invention.

FIG. 2 shows the sequence of message forwarding between nodes in a standby path when the first embodiment of the present invention is applied to the network shown in FIG. 4.

FIG. 1 shows the configuration of the first embodiment of the present invention. The intermediate ATM node (400), which is an intermediate node in the standby path, comprises a VPG switching-message receiving circuit 401 which receives grouped alarm and switching-request messages, a VPG switching-message sending circuit 402 which sends VPG switching messages to the next node, a VPG resource allocation circuit 403 which allocates node resources and network resources to a VPG at a time, a VP expansion circuit 404 which expands a VPG into individual VPs, a VP resource distribution circuit 405 which distributes the VPG resources to VPs, one or more node resource management circuits 406-i (i=1, 2, . . . n) which manage the actual distribution of resources in the entire node, a VP resource information management table 451 which stores therein the amount of resource requirements for each VP, a VPG configuration information management table 452 which stores therein information for identifying the VPs constituting a VPG, and a VPG resource information management table 453 which stores therein the amount of resource requirements for each VPG.

Figure 7:
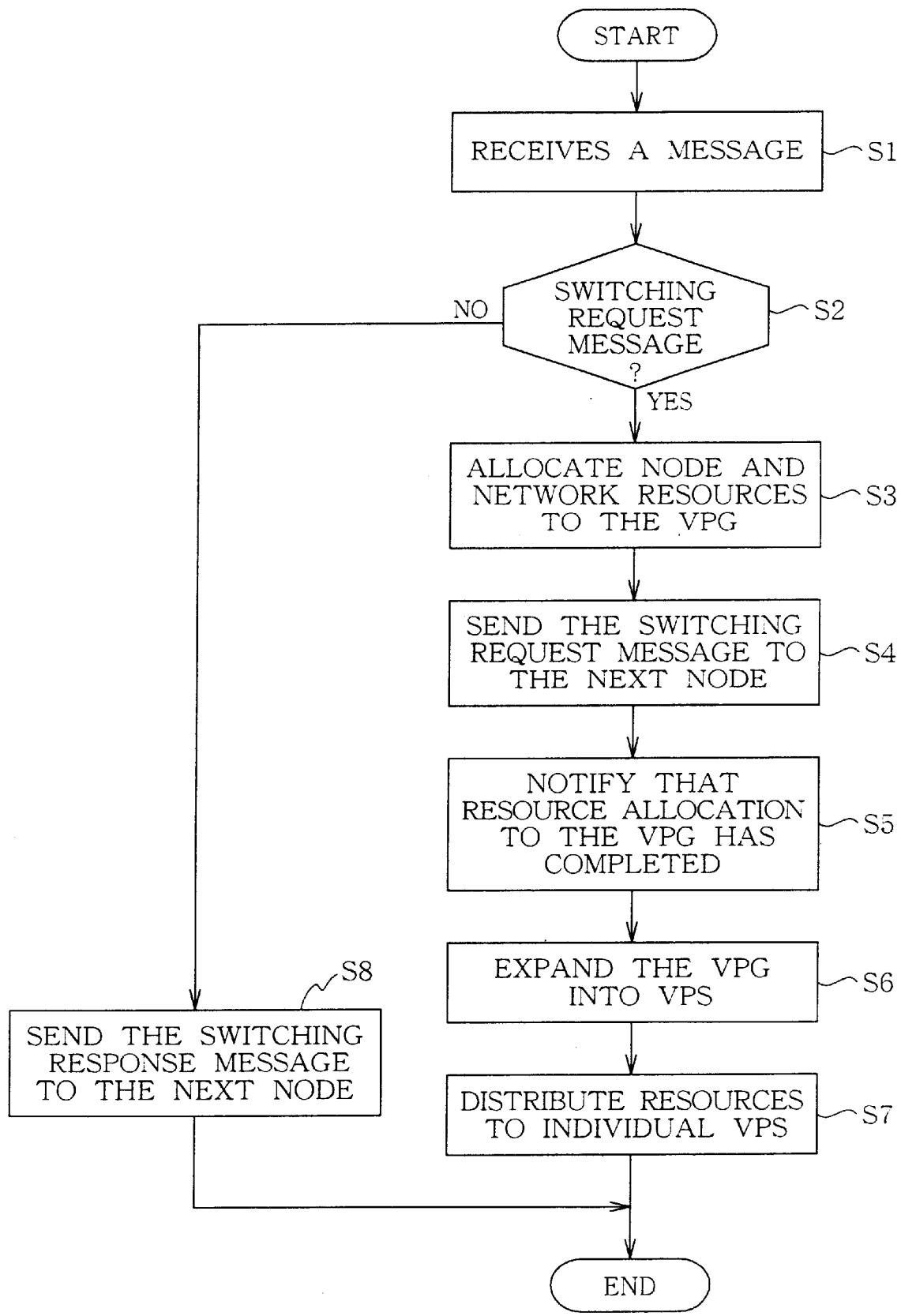
FIG. 7 is a flowchart showing the steps of the first embodiment.

The intermediate ATM node (400) receives a grouped switching-request message 491 or a switching-response message 492 from another node and forwards it to the next node (Step S1, S8 in FIG. 7). The VPG switching-message receiving circuit 401 receives the VPG switching-request message 491 which arrives the intermediate ATM node 400. The VPG switching-message receiving circuit 401 checks the message and, after identifying that the message is a VPG message, sends it to the VPG resource allocation circuit 403.

The VPG resource allocation circuit 403 references the VPG resource information management table 453 to determine the resource amount required for the VPG. It then uses the node resource management circuits 406-i (i=1, 2 . . . n) to allocate node resources and network resources for the VPG at a time (Step S3).

Then, the VPG resource allocation circuit 403 sends the switching-request message 491 to the next node via the VPG switching-message sending circuit 402 without expanding the VPG into individual VPs (Step S4). At the same time, the VPG resource allocation circuit 403 sends a VPG resource allocation completion notification to the VP expansion circuit 404 (Step S5).

The VP expansion circuit 404 references the VPG configuration information management table 452 to expand the VPG into individual VPs (Step S6) and sends the identifiers of the VPs to the VP resource distribution circuit 405.

The VP resource distribution circuit 405 references the VP resource information management table 451 to check the resource requirements for each VP and, based on this information, distributes the VPG resources to the VPs (Step S7). At the same time, the VP resource distribution circuit 405 modifies the resource management status through the node resource management circuit 406-i (i=1, 2, 3, . . . n) as necessary.

The VPG switching-message receiving circuit 401 and the VPG switching-message sending circuit 402 forward the switching-response message 492. During this message forwarding processing, no check is made as to whether or not resource distribution to VPs has been completed.

Although the configuration of an intermediate node in an ATM network is shown in FIG. 1, it is apparent that the present invention is not limited to intermediate nodes but that it may be applied to other ATM nodes.

For example, a switching-request message sending endpoint node (ATM node 101 in FIG. 4) in the configuration shown in FIG. 1 performs the same operation as that of an intermediate node, except that the switching-request message 491 is an error information message and that the switching-response message 492 is terminated at the switching-request message sending endpoint. Also, a switching-request message receiving node (ATM node 103 in FIG. 4) basically performs the same operation as that of an intermediate node, except that the switching-response message, not the switching-request message, is sent to the next node.

Next, referring to FIG. 12, the sequence of message transfer between nodes in the standby path will be described with the node configuration of the above embodiment applied to each node in the network shown in FIG. 4

When the ATM node 101 detects an error that occurred in the working path, it performs VPG resource allocation processing 611.

Upon completion of the VPG resource allocation processing 611, the ATM node 101 sends the VPG switching-request message to the ATM node 104 which is the next node. After this message is sent, VP expansion processing 612 is performed to expand the VPG into individual VPs. Also, VP resource distribution processing 613 is performed to distribute resources to each VP.

The similar processing is performed at the ATM node 104 which is an intermediate node. That is, upon completion of the VPG resource allocation processing 611, the ATM node 104 sends the VPG switching-request message to the ATM node 103 which is the next node. After that, at the ATM node 104, the VP expansion processing 612 and the VP resource distribution processing 613 are performed.

The ATM node 103, which is the other endpoint node, also performs the similar processing and then sends the VPG switching-response message to the ATM node 101. The switching-request message is forwarded through sending/receiving processing 614 at the node ATM node 104 and is sent to the ATM node 101. Then, message switching is completed.

In the embodiment described above, the message is sent to the next node immediately after the resources are allocated to the VPG. Resource allocation to the VPs is done concurrently with the transfer of the message or with the processing in the subsequent node. That is, before the message is sent, there is no need to wait at the node until the resources are allocated to the VPs. This prevents the error recovery time from increasing even when the number of VPs increases.

Second Embodiment

Next, a second embodiment of the present invention will be described. FIG. 3 shows the configuration of a node in the VP protection system according to the present invention. The figure shows the configuration of an intermediate node in the standby path (corresponding to the ATM node 104 in FIG. 4).

In the second embodiment of the present invention shown in FIG. 3, an ATM node 500 comprises a VPG switching-message receiving circuit 501 which receives grouped alarm and switching-request messages, a VPG switching-message sending circuit 502 which sends VGP switching messages to the next node, a VPG resource allocation circuit 503 which allocates node resources and network resources to the VPG at a time, a VP expansion circuit 504 which expands a VPG into individual VPs, a VP resource distribution circuit 505 which distributes the VPG resources to VPs, one or more node resource management circuits 506-i (i=1, 2, . . . n) which manage the actual distribution of resources in the entire node, a resource allocation checking circuit 507 which receives a VP resource allocation completion notification from the VP resource distribution circuit 505 and, if necessary, delays the forwarding of a switching-response message until the VP resources are allocated, a VP resource information management table 551 which stores therein the amount of resource requirements for each VP, a VPG configuration information management table 552 which stores therein information for identifying the VPs constituting a VPG, and a VPG resource information management table 553 which stores therein the amount of resource requirements for each VPG.

In the second embodiment of the present invention, the ATM node 500 is similar to the ATM node 400 used in the first embodiment shown in FIG. 1 but further comprises the resource allocation checking circuit 507. A sequence of processing, beginning with the forwarding of a VPG switching-request message 591 and ending with the distribution of VPG resources to the VPs (Step S1 to S7), is the same as that the ATM node 400 of the first embodiment.

Figure 8:
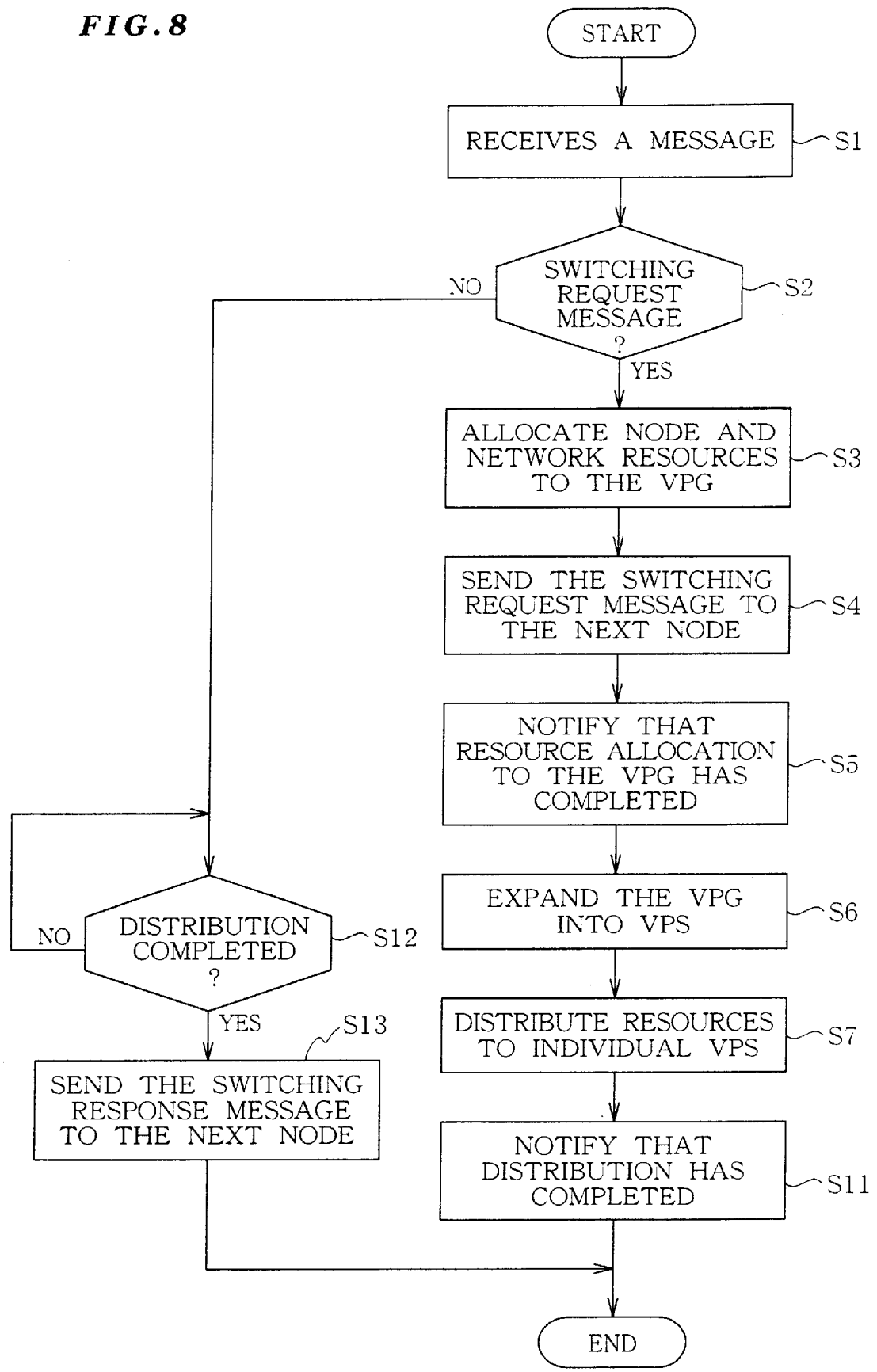
FIG. 8 is a flowchart showing the steps of the second embodiment.

When the distribution of resources to the VPs is completed (Step S7 in FIG. 8), the resource allocation checking circuit 507 in the ATM node 500 receives a notification notifying that the distribution of resources is completed (Step S11).

Also, when the VPG switching-message receiving circuit 501 in the ATM node 500 receives a switching-response message, the resource allocation checking circuit 507 receives a notification notifying that the switching-response message has been received.

At this time, if the resource allocation checking circuit 507 has already received a VP resource distribution completion notification from the VP resource distribution circuit 505 (Step S12), it sends the switching-response message to the VPG switching-message sending circuit 502 for transmission to the next node (Step S13).

If the resource allocation checking circuit 507 has not yet received a VP resource distribution completion notification from the VP resource distribution circuit 505, it waits for the notification to arrive. Upon receiving the notification, the resource allocation checking circuit 507 sends the switching-response,message to the VPG switching-message sending circuit 502 for transmission to the next node (Step S12).

The configuration of the second embodiment of the present invention provides the user with the advantage similar to that provided by the first embodiment. That is, the message is sent to the next node immediately after the resources are allocated to the VPG. Resource allocation to the VPs is done concurrently with the transfer of the message or with the processing in the subsequent node. In addition, the resource allocation checking circuit 507 makes it possible to confirm that VP resources have been allocated.

As described above, the present invention allows messages to be sent quickly to nodes on an ATM network even when an ATM network error occurs.

The reason is that, in the protection system according to the present invention in which switching messages are issued to a VPG composed of a plurality of VPs, an ATM node which receives a switching-request message allocates the node resources and network resources required for the VPG. And, before expanding the VPG into VPs, the ATM node forwards the message to the VPG in the next node and, after that, redistributes the resources, allocated to the VPG in its own node, to the individual VPs. This allows message transfer and resource distribution to be done concurrently, thereby reducing the protection switching time.

Another advantage is that the status checking of resource allocation, if required for each node, may be made when a switching-response message is received. Although this function requires additional resource allocation checking to be made during message forwarding processing at an ATM node, the present invention allows VP resource allocation processing and message forwarding to be done concurrently, reducing the error recovery time.

The invention may be embodied in other specific forms without departing from the spirit or essential characteristic thereof. The present embodiments is therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 10-229218 (Filed on Aug. 14, 1998) including specification, claims, drawings and summary are incorporated herein by reference in its entirety.

What is claimed is:

1. A VP protection system which restores Virtual Paths when an error occurs on an ATM (Asynchronous Transfer Mode) network, the system comprising:

a first node in a standby path comprising a unit for allocating resource information for a plurality of working VP groups for management of resources on a group basis and wherein, when a plurality of particular VPs are switched to standby VPs due to an error in the plurality of particular VPs said first node allocates the resources for the group of the plurality of particular VPs in response to a grouped VP switching request message and forwards the grouped VP switching request message and forwards the grouped VP switching request message to a next node;

wherein, after the resources of the group of the plurality of particular VPs are allocated, the first node forwards the switching request message to the next node and, at substantially the same time, expands the group of the plurality of particular VPs into VPs and distributes resources to the VPs.

2. The VP protection system for use on the ATM network according to claim 1, wherein a sending endpoint node is the first node, the sending endpoint node issues the grouped VP switching request message and allocates the resource information on the group of the plurality of particular VPs, said sending endpoint node being in said standby path, and wherein said sending endpoint node allocates the resources for the group of the plurality of particular VPs and forwards the grouped VP switching request message to the next node in response to an error information message.

3. The VP protection system for use on the ATM network according to claim 1, wherein a receiving endpoint node is the first node, the receiving endpoint node receives the grouped VP switching-request message and allocates the resource information on the group of the plurality of particular VPs, said receiving endpoint node being in said standby path.

4. A VP protection system which restores VPs (Virtual Paths) when an error occurs on an ATM (Asynchronous Transfer Mode) network, the system comprising:

a first node in a stand by path including a unit which allocates resource information on a plurality of working VP groups for management of resources on a group basis and wherein, when a plurality of particular VPs are switched to standby VPs due to an error in the plurality of particular VPs said first node allocates resources for the group of the plurality of particular VPs in response to a grouped VP switching request message and forwards the grouped VP switching request message to a next node; and wherein said first node forwards a switching-response message to the next node without checking that a resource distribution unit has completed resource distribution to the VPs in said first node.

5. The VP protection system according claim 4, wherein the first node further comprises a resource allocation checking unit which receives a resource allocation completion notification from said unit which allocates resources upon completion of VP resourced distribution, and wherein, in response to a switching response message, said resource allocation checking unit checks if the resource allocation completion notification is received, forwards the switching response message to the next node if the resource allocation completion notification is received, and waits for the resource allocation completion notification and then forwards the switching response message to the next node if the notification is not yet received.

6. A VP protection method for restoring VPs (Virtual Paths) when an error occurs in an ATM (Asynchronous Transfer mode) network, the method comprising the steps of:

in at least a first node in a standby path, allocating resource information on a plurality of working VP groups for management of resources on a group basis;

when a group of plurality of particular VPs, are switched to standby VPs due to an error in the plurality of particular VPs allocating resources for the group of the plurality of particular VPs in response to a grouped VP switching request message and forwarding the grouped VP switching request message to a next node; and wherein, after the resources of the group of the plurality of particular VPs are allocated, the first node forwards the switching request message to the next node and, at substantially the same time, expands the group of the plurality of particular VPs into VPs and distributes resources to the VPs.

7. The VP protection method for use on the ATM network according to claim 6, wherein a sending endpoint node or a receiving endpoint node from or at which the grouped VP switching-request message is sent or received is the first node and allocates the resource information on the group of the plurality of particular VPs, said sending endpoint node and said receiving endpoint node being in said standby path.

8. A VP protection method for restoring VPs (Virtual Paths) when an error occurs in an ATM (Asynchronous Transfer mode) network, the method comprising the steps of:

in at least a first node in a standby path, allocating resource information on a plurality of working VP groups for management of resources on a group basis;

when a group of a plurality of particular VPs are switched to standby VPs due to an error in the plurality of particular VPs, allocating resources for the group of the plurality of particular VPs in response to a grouped VP switching request message and forwarding the grouped VP switching request message to a next node;

wherein, after a VP switching response message is received, said first node forwards the VP switching response message to the next node without checking that resource distribution to the VPs has completed in said first node.

9. The VP protection method for use on an ATM network according to claim 8, the method further comprising the step of, in response to a switching response message, checking in said first node if a resource allocation completion notification indicating completion of said resource distribution is received and, if the resource allocation completion notification is received, forwarding the switching response message to the next node and, if the resource allocation completion notification is not yet received, delaying a forwarding of the switching response message to the next node until the resource allocation completion notification is received.

10. A computer program stored on a storage medium including data for restoring VPs (Virtual Paths) when an error occurs on an ATM (Asynchronous Transfer Mode) network, wherein the program causes the computer to:

in at least a first node in a standby path, allocating resource information on a plurality of working VP groups for management of resources on a group basis;

when a group of a plurality of particular VPs, are switched to standby VPs due to an error in the plurality of particular VPs allocating resources for the group of the plurality of particular VPs in response to a grouped VP switching request message and forwarding the grouped VP switching request message to a next node; and wherein, after the resources of the group of the plurality of particular VPs are allocated, the first node forwards the switching request message to the next node and, at substantially the same time, expands the group of the plurality of particular VPs into VPs and distributes resources to the VPs.

11. The computer program according to claim 10, wherein a sending endpoint node or a receiving endpoint node from or at which the grouped VP switching-request message is sent or received is the first node and allocates the resource information on the group of plurality of particular VPs, said sending endpoint node and said receiving endpoint node being in said standby path.

12. A VP protection system, for use on an ATM network comprising:

a plurality of ATM nodes; a plurality of working VPs used as information transmission paths among said plurality of nodes;

a plurality of standby VPs used as bypass paths when an error occurs on said working VPs, wherein, when said plurality of working VPs are switched to the corresponding standby VPs upon detection of the error on said plurality of working VPs, messages are exchanged among said ATM nodes with CP groups each including a plurality of VPs each of said ATM nodes comprising:

a VPG resource information management table which stores therein an amount of resource requirements for a virtual path group;

a VP resource information management table which stores therein an amount of resource requirements for each VP;

a VPG configuration information management table which stores therein information for identifying the VPs forming the VPG;

a VPG switching message receiving circuit which receives 20 a VPG switching request message or a VPG switching response message transferred between endpoint nodes in a switching section;

a VPG switching message sending circuit which sends the VPG switching request message or the VPG switching response message transferred between the endpoint nodes in the switching section to another node;

one or more node resource management circuits which allocate node resources or network resources in a particular node in response to a request generated in the particular node;

a VPG resource allocation circuit which references said VPG resource information management table to allocate the node resources and the network resources to the VPG in response to said VPG switching request message;

a VP expansion circuit which expands the VPG into individual VPs; and a VP resource distribution circuit which references said VP resource information management table and distributes the VPG resources allocated by said VPG resource allocation circuit to the individual VPs expanded by said VP expansion circuit.

13. The VP protection system according to claim 12, wherein, after said VPG resource allocation circuit has allocated the resources to the VPG, said VPG switching message sending circuit forwards the message to the next node and, at substantially the same time, said VP expansion circuit expands the VP group into the individual VPs and said VP resource distribution circuit distributes the resources to the individual VPs.

14. The VP protection system according to claim 12, wherein, after said VPG switching message receiving circuit receives the switching response message, said VPG switching message sending circuit forwards the switching response message to the next node without checking that said VP resource distribution circuit has completed the resource distribution to the individual VPs in said ATM node.

15. The VP protection system according claim 14, wherein said ATM node further comprises a resource allocation checking circuit which receives a resource allocation completion notification from said VP resource distribution circuit, and wherein, in response to the switching response message received by said V PG switching message receiving circuit, said resource allocation checking circuit checks if the resource allocation completion notification is received, forwards the switching response message to the next node if the resource allocation completion notification is received, and waits for the resource allocation completion notification and then forwards the switching response message to the next node if the resource allocation completion notification is not yet received.

16. A computer program stored on a storage medium including data for restoring VPs (Virtual Paths) when an error occurs on an ATM (Asynchronous Transfer Mode) network, wherein the program causes the computer to:

in at least a first node in a standby path, allocating resource information on a plurality of working VP groups for management of resources on a group basis;

when a group of plurality of particular VPs are switched to standby VPs due to an error in the plurality of particular VPs, allocating resources for the group of the plurality of particular VPs in response to a grouped VP switching request message and forwarding the grouped VP switching request message to a next node;

wherein, after a VP switching response message is received, said first node forwards the VP switching response message to the next node without checking that resource distribution to the VPs has completed in said first node.

17. The computer program according to claim 16, wherein the computer program further causes the computer to, in response to a switching response message, check in said first node if a resource allocation completion notification indicating completion of said resource distribution is received and, if the resource allocation completion notification is received, forwarding the switching response message to the next node and, if the resource allocation completion notification is not yet received, delay a forwarding of the switching response message to the next node until the resource allocation completion notification is received.

* * * * *